(No Model.)
S. C. JESSUP.
BICYCLE HANGER.
No. 579,584. Patented Mar. 30, 1897.
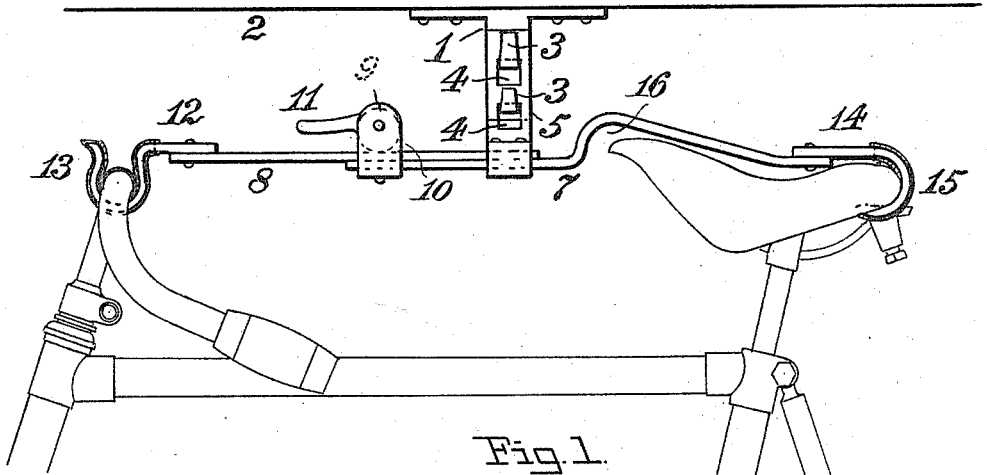
Fig. 1.
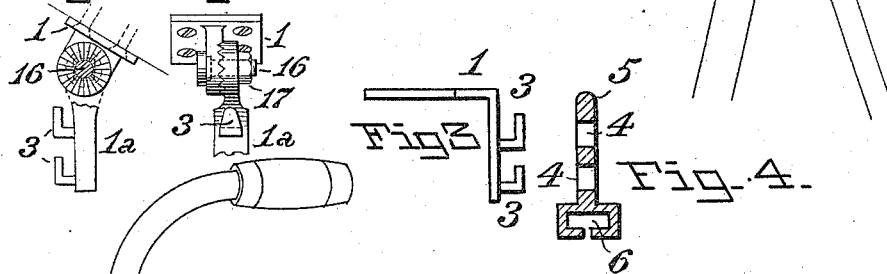
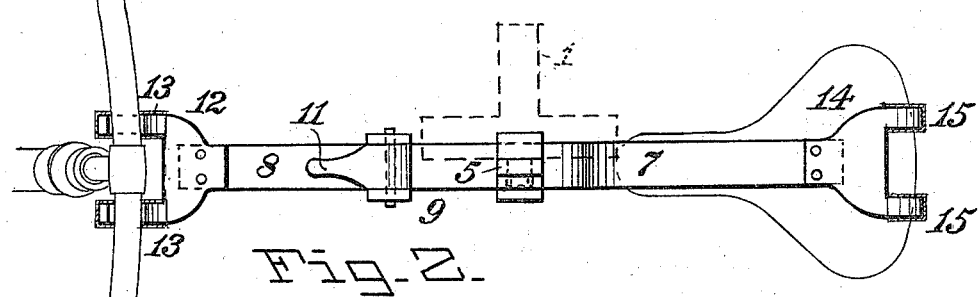
Fig. 2.
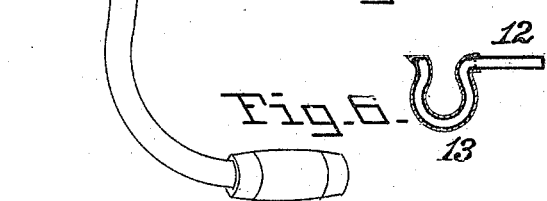
Fig. 6.
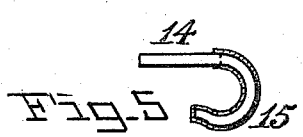
Fig. 5.
WITNESSES:
T. J. Hogan.
N. E. Gaither.
INVENTOR:
S. C. Jessup,
by J. Snowden Bell
Atty.

UNITED STATES PATENT OFFICE.

STEPHEN C. JESSUP, OF SALEM, OHIO.

BICYCLE-HANGER.

SPECIFICATION forming part of Letters Patent No. 579,584, dated March 30, 1897.

Application filed August 29, 1896. Serial No. 604,303. (No model.)

*To all whom it may concern:*

Be it known that I, STEPHEN C. JESSUP, of Salem, in the county of Columbiana and State of Ohio, have invented a certain new and useful Improvement in Bicycle-Hangers, of which improvement the following is a specification.

The object of my invention is to provide a simple and inexpensive device for suspending a bicycle from the ceiling or roof of a building, vehicle, or vessel in order to enable the same to be so disposed for stowage or transportation as to be protected from injury by contact with other articles and to permit the floor-space below it in the vehicle or apartment to be utilized for the reception of other articles.

My invention is specially designed for and adapted to use in baggage-cars on railroads, in which the transportation of bicycles when stowed on the floor of the car in the usual manner involves more or less inconvenience, risk of injury, and encroachment on space which is needed for the stowage of ordinary baggage.

The improvement claimed is hereinafter fully set forth.

In the accompanying drawings, Figure 1 is a side view in elevation of a bicycle-hanger embodying my invention; Fig. 2, a plan or top view of the same; Fig. 3, a side view of the supporting-bracket; Fig. 4, a transverse section through the socket-piece which connects therewith; Figs. 5 and 6, side views of the supporting-hooks, and Figs. 7 and 8 views showing an adjustable supporting-bracket.

In the practice of my invention I provide a supporting-bracket 1, which is bolted or otherwise suitably secured to the ceiling 2 of a car or of a compartment in a building or vessel, as the case may be. Two upwardly-turned hooks or catches 3 3 are formed on or fixed to one side of the hanger 1, said hooks being adapted to engage openings 4 4 in the body of an attachable and detachable socket-piece 5, having a socket or passage 6 at right angles to the openings 4 in its lower end. It will be obvious that, if preferred, an independent socket-piece may be dispensed with and the socket 6 formed directly on the lower end of the bracket 1, but the use of a separate socket-piece enables a shorter bracket to be employed and the socket to be located at a greater or less distance from the ceiling, as desired.

Two plates or bars 7 8 are fitted freely, one above the other, in the socket 6, said plates being longitudinally adjustable, one relatively to the other, in the socket. The plates 7 8 are clamped firmly together in any adjusted position by a cam 9, which is journaled in bearings 10 on one of the plates, (in the instance shown the plate 7,) and is provided with a handle 11, by means of which it may be turned into position to bear tightly against the adjacent face of the other plate and thereby to connect the plates together. By releasing the cam the plates 7 8 may be moved longitudinally one upon the other to increase or diminish the distance from the outer end of one plate to the corresponding end of the other, as may be required to suit the length of the bicycle which is to be supported, and after the proper adjustment for this purpose they are again clamped together by the cam.

A hook-plate 12, having two hooks 13 to engage the handle-bar of a bicycle, is secured upon the outer end of one of the plates. In this case the plate 7 and a hook-plate 14, having a hook or hooks 15, is secured upon the outer end of the other plate 8. Two hooks are necessary on the plate 12 in order to afford support for the handle-bar on each side of its stem, but a single hook, if made of sufficient width, may, if desired, be employed on the plate 14 to engage the middle portion of the saddle. In the instance shown the plate 14 is provided with two hooks, and this construction I deem preferable as affording a firmer support and avoiding liability to tilt. The bar 7, which carries the saddle hook-plate 14, is also preferably bent upwardly and downwardly, as shown in Fig. 1, to provide a recess 16 for the reception of the inner end portion of the saddle, thereby enabling that end of the bicycle to be supported correspondingly nearer to the roof.

In order to render the appliance conveniently adaptable to use where the ceiling, or a portion thereof to which it is desired to make connection, may be inclined to a greater or less degree, an adjustable supporting-bracket, a suitable form of which is shown in Figs. 7 and 8, may be employed. In this case the bracket is made in two sections, one of which, 1, is secured to the ceiling, and the other, 1ª, which carries the hooks 3, is connected adjustably to it by a clamping-bolt 16, provided with a nut 17. The portions of the sections through which the clamping-bolt passes may be provided with serrated or toothed faces, so that the sections will be firmly held together in any adjusted position, and by releasing the nut 17 the movable section 1ª may be turned into any desired relation to the fixed section and clamped therein to receive the other members of the appliance.

I claim as my invention and desire to secure by Letters Patent—

1. The combination, substantially as set forth, of a supporting-bracket, a lower socket connected thereto, two plates fitting in said socket and projecting oppositely therefrom, and supporting-hooks fixed to the outer ends of said plates.

2. The combination, substantially as set forth, of a supporting-bracket, a lower socket connected thereto, plates fitting in said socket and projecting oppositely therefrom, a clamping device for connecting and disconnecting said plates, and supporting-hooks fixed to the outer ends of said plates.

3. The combination, substantially as set forth, of a supporting-bracket, a lower socket connected thereto, a plate fitting in and projecting outwardly from said socket, a hook-plate secured to the outer end of said plate and carrying hooks to support a bicycle handle-bar, a plate fitting in and projecting outwardly from the socket in opposite direction from the plate first specified, and bent to form a recess to receive the inner portion of a bicycle-saddle, and a hook-plate secured to the outer end of said last-specified plate and carrying a hook or hooks to support a bicycle-saddle.

4. The combination, substantially as set forth, of a supporting-bracket, a lower socket connected thereto, two plates fitting in and projecting oppositely from said socket, a cam journaled on one of said plates and adapted to bear against the other, and supporting-hooks fixed to the outer ends of said plates.

5. The combination, substantially as set forth, of a supporting-bracket, a socket-piece connected detachably thereto and having a socket in its lower end, two plates fitting in and projecting oppositely from said socket, and supporting-hooks fixed to the outer ends of said plates.

6. The combination, substantially as set forth, of a supporting-bracket composed of a fixed section and a movable section connected adjustably thereto, a socket-piece connected detachably to the movable section of the supporting-bracket and having a socket in its lower end, two plates fitting in and projecting oppositely from said socket, and supporting-hooks fixed to the outer ends of said plates.

STEPHEN C. JESSUP.

Witnesses:
E. B. FRITCHMAN,
EDGE T. COPE.